(12) United States Patent
Lee et al.

(10) Patent No.: US 9,586,820 B2
(45) Date of Patent: Mar. 7, 2017

(54) APPARATUS FOR PREPARING GERMANE GAS AND METHOD FOR PREPARING MONOGERMANE GAS USING SAME

(71) Applicant: SK-MATERIALS CO., LTD, Yeongju (KR)

(72) Inventors: Tae Hee Lee, Yeongju-si (KR); Won Ho Lee, Daejeon (KR); Byung Kwan Kwon, Yeongju-si (KR)

(73) Assignee: SK-MATERIALS CO., LTD., Yeongju (KR)

( * ) Notice: Subject to any disclaimer, the term of this patent is extended or adjusted under 35 U.S.C. 154(b) by 0 days.

(21) Appl. No.: 14/623,966

(22) Filed: Feb. 17, 2015

(65) Prior Publication Data

US 2015/0175418 A1 Jun. 25, 2015

Related U.S. Application Data (63) Continuation of application No. PCT/KR2013/007465, filed on Aug. 20, 2013.

(30) Foreign Application Priority Data

Aug. 20, 2012 (KR) ........................ 10-2012-0090756

(51) Int. Cl.
*C01B 6/06* (2006.01)
*B01J 19/00* (2006.01)
(Continued)

(52) U.S. Cl.
CPC ............. *C01B 6/06* (2013.01); *B01J 19/0013* (2013.01); *B01J 19/0066* (2013.01);
(Continued)

(58) Field of Classification Search
CPC ..... C01B 6/06; B01J 19/0013; B01J 19/0066; B01J 19/0093; B01J 19/18; B01J 19/248; C01G 17/00
(Continued)

(56) References Cited

U.S. PATENT DOCUMENTS

| 4,668,502 A | * | 5/1987 | Russotti | ................... C01B 6/06 |
| | | | | 423/645 |
| 6,388,317 B1 | * | 5/2002 | Reese | ................... H01L 23/473 |
| | | | | 257/713 |
| 2008/0299037 A1 | | 12/2008 | Tezock | |

FOREIGN PATENT DOCUMENTS

| JP | 10-291804 A | 11/1998 |
| JP | 2000-302411 A | 10/2000 |

OTHER PUBLICATIONS

Ehrfled et al. "Microreactors" 2000, Wiley-VCH.*
WIPO, International Search Report (PCT/KR2013/007465), Nov. 13, 2013.

* cited by examiner

*Primary Examiner* — Melvin C Mayes
*Assistant Examiner* — Syed Iqbal
(74) *Attorney, Agent, or Firm* — STIP Law Group, LLC (57) ABSTRACT

The present disclosure relates to an apparatus for preparing germane gas and a method for preparing monogermane gas using same. More particularly, the present disclosure relates to an apparatus for preparing germane gas, capable of stably producing a large amount of monogermane gas by mixing starting materials in short time and removing reaction heat at the same time using a reactor having a microstructured channel, and a method for preparing monogermane gas using same. In accordance with the present disclosure, it is easy to control rapid increase of reaction temperature and pressure during mass production of germane gas. Accord- (Continued)

ingly, monogermane gas can be produced in large scale with high yield.

11 Claims, 5 Drawing Sheets

(51) Int. Cl.
    *C01G 17/00*       (2006.01)
    *B01J 19/18*       (2006.01)
    *B01J 19/24*       (2006.01)

(52) U.S. Cl.
    CPC ........... *B01J 19/0093* (2013.01); *B01J 19/18* (2013.01); *B01J 19/248* (2013.01); *C01G 17/00* (2013.01); *B01J 2219/00063* (2013.01); *B01J 2219/00087* (2013.01); *B01J 2219/00094* (2013.01); *B01J 2219/00186* (2013.01); *B01J 2219/00783* (2013.01); *B01J 2219/00813* (2013.01); *B01J 2219/00889* (2013.01); *B01J 2219/00961* (2013.01); *B01J 2219/2401* (2013.01)

(58) Field of Classification Search
    USPC ......................................................... 423/645
    See application file for complete search history.

APPARATUS FOR PREPARING GERMANE GAS AND METHOD FOR PREPARING MONOGERMANE GAS USING SAME

REFERENCE TO RELATED APPLICATIONS

This is a continuation of pending International Patent Application PCT/KR2013/007465 filed on Aug. 20, 2013, which designates the United States and claims priority of Korean Patent Application No. 10-2012-0090756 filed on Aug. 20, 2012, the entire contents of which are incorporated herein by reference.

FIELD OF THE INVENTION

The present disclosure relates to an apparatus for preparing germane gas and a method for preparing monogermane gas using the same. More particularly, the present disclosure relates to an apparatus for preparing germane gas, capable of stably producing a large amount of monogermane gas by mixing starting materials in a short time and removing reaction heat using a reactor having a microstructured channel, and a method for preparing monogermane gas using same.

BACKGROUND OF THE INVENTION

Germane gas is used in the semiconductor industry. It allows the application of strained silicon to computer CPUs and has become a key material in the newly emerging germanium channels and gates. Also, the germane gas is used in the formation of the intermediate SiGe layer of the triple junction of the 5th-generation amorphous silicon thin-film solar cell (a-Si solar cell), as it enhances absorption of light in the mid-wavelength range of 300-900 nm, and thus, improving the cell efficiency. Accordingly, with the expected increase in the demand on the next-generation thin-film solar cells, the demand on germane gas is also expected to grow rapidly.

Synthesis of germane gas and chemical reactions involved therein has been studied by many chemists since 1930s. Typical examples include a chemical method of reducing germanium dioxide ($GeO_2$) or germanium tetrachloride ($GeCl_4$) using sodium borohydride ($NaBH_4$), lithium aluminum hydride ($LiAlH_4$), etc., an electrochemical method of electrolyzing germanium dioxide and a high-energy method of reacting germanium (Ge) directly with hydrogen.

As for the existing methods of preparing germane gas using germanium dioxide or germanium tetrachloride, the yield is only about 70%. In particular, when monogermane gas is prepared using germanium dioxide which is easier to handle than germanium tetrachloride, it is difficult to prepare monogermane gas in high yield.

In this regard, U.S. Pat. No. 4,668,502 discloses that the yield of germane gas can be increased up to 97%, even when germanium dioxide ($GeO_2$) is used as the same raw material, by varying reaction conditions, i.e. combinations of germanium dioxide concentration, alkali/germanium dioxide ratio in an aqueous alkali solution wherein germanium dioxide is dissolved, amount of alkali metal borohydride, acid concentration, reaction temperature, etc. Indeed, a high germane yield of around 90% was achieved when experiment was conducted according to the reaction conditions specified in the examples and claims of U.S. Pat. No. 4,668,502.

However, if the aqueous alkali solution wherein germanium dioxide and the alkali metal borohydride are dissolved is reacted with an aqueous acid solution in batches or continuously according to the above method, germane gas is produced explosively in short time and high reaction heat is accompanied. This means that if the preparation of germane gas is carried out in industrial scale, not in laboratory scale, it will be difficult to control its reaction rate and reaction heat. If the high reaction heat is not controlled adequately, its reaction temperature may increase rapidly (about 50° C. or higher) and higher germane may be formed, thereby negatively affecting the yield of monogermane gas.

The inventors of the present disclosure have made consistent efforts to solve the above problem. As a result, they have found out that the problem can be solved by mixing starting materials in a short time and removing reaction heat at the same time using a reactor having a microstructured channel.

SUMMARY OF THE INVENTION

The present disclosure is directed to providing an apparatus for preparing germane gas and a method for preparing monogermane gas using the same, particularly an apparatus for preparing germane gas, capable of stably producing a large amount of monogermane gas by mixing starting materials in short time and effectively removing reaction heat at the same time using a reactor having a microstructured channel, thereby controlling rapid increase in reaction temperature and pressure during the production of germane gas, and a method for preparing monogermane gas using same.

In a general aspect, there is provided a method for preparing monogermane gas, including: injecting an aqueous alkali solution of starting materials, which contains germanium dioxide ($GeO_2$) and an alkali metal hydride, and an aqueous acid solution into a first channel and a second channel, respectively; mixing the injected aqueous alkali solution of starting materials and the aqueous acid solution in a third channel which is connected to one end of the first channel and one end of the second channel, and reacting same to produce monogermane gas and a reaction solution; and discharging the produced monogermane gas and the reaction solution out of the third channel, wherein the reaction heat generated in the third channel is absorbed by a coolant circulating in a coolant circulation unit disposed adjacent to the third channel.

In an exemplary embodiment, the third channel is a microchannel.

In an exemplary embodiment, the third channel includes a main channel and a plurality of projections, protruding in parallel, formed on one side of the main channel. Specifically, the plurality of projections may have an acute angle with respect to the main channel and may protrude in one direction.

In an exemplary embodiment, the third channel is maintained at a temperature of 0-50° C.

In an exemplary embodiment, the temperature of the third channel is controlled by controlling at least one selected from a flow rate of the coolant, a temperature of the coolant, and a flow rate of the aqueous alkali solution of starting materials or the aqueous acid solution.

In an exemplary embodiment, the reaction heat generated in the third channel is transferred to a first metal block surrounding the third channel, the reaction heat transferred to the first metal block may be transferred to a second metal block contacting with the first metal block, the reaction heat transferred to the second metal block is transferred to a coolant circulation unit surrounded by the second metal block, and the reaction heat transferred to the coolant circulation unit is absorbed by a coolant circulating in the coolant circulation unit.

In an exemplary embodiment, the third channel is at least one in number, the at least one third channel may be connected in parallel, and the aqueous alkali solution and the aqueous acid solution may be injected respectively into the at least one third channel so as to produce monogermane gas in the at least one third channel.

In an exemplary embodiment, the alkali metal hydride is $NaBH_4$.

In an exemplary embodiment, the aqueous acid solution includes an inorganic acid or an organic acid, wherein the inorganic acid is one or more selected from a group consisting of sulfuric acid and phosphoric acid, and the organic acid is one or more selected from a group consisting of acetic acid and propionic acid.

In another general aspect, there is provided an apparatus for preparing germane gas, including: a first channel into which an aqueous alkali solution of starting materials is injected; a second channel into which an aqueous acid solution is injected; a third channel which is connected to one end of the first channel and one end of the second channel and in which the aqueous alkali solution and the aqueous acid solution are mixed and reacted to produce monogermane gas and a reaction solution; a discharge outlet through which the monogermane gas and the reaction solution produced in the third channel are discharged; and a coolant circulation unit which is disposed adjacent to the third channel and into and out of which a coolant is injected and discharged, wherein the reaction heat generated in the third channel is absorbed by the coolant.

In an exemplary embodiment, the third channel is a microchannel.

In an exemplary embodiment, the third channel and the coolant circulation unit are disposed spaced apart from each other, the third channel is surrounded by a first metal block, the coolant circulation unit is surrounded by a second metal block, and the first metal block and the second metal block are disposed in contact with each other.

In accordance with the present disclosure, rapid increase in reaction temperature and pressure during production of germane gas can be controlled by mixing starting materials in a short time and effectively removing reaction heat at the same time using a reactor having a microstructured channel. Also, in accordance with the present disclosure, a large amount of monogermane gas can be produced with high yield.

DETAILED DESCRIPTION OF THE INVENTION

Hereinafter, the present disclosure is described in detail.

As used in the present disclosure, the term microchannel refers to a microstructured channel. The channel may have a diameter ranging from several micrometers to thousands of micrometers.

As used in the present disclosure, the term reaction solution refers to a solution remaining after germane gas is produced from reaction of an aqueous alkali solution of starting materials and an aqueous acid solution.

Apparatus for Preparing Germane Gas

Figure 1:
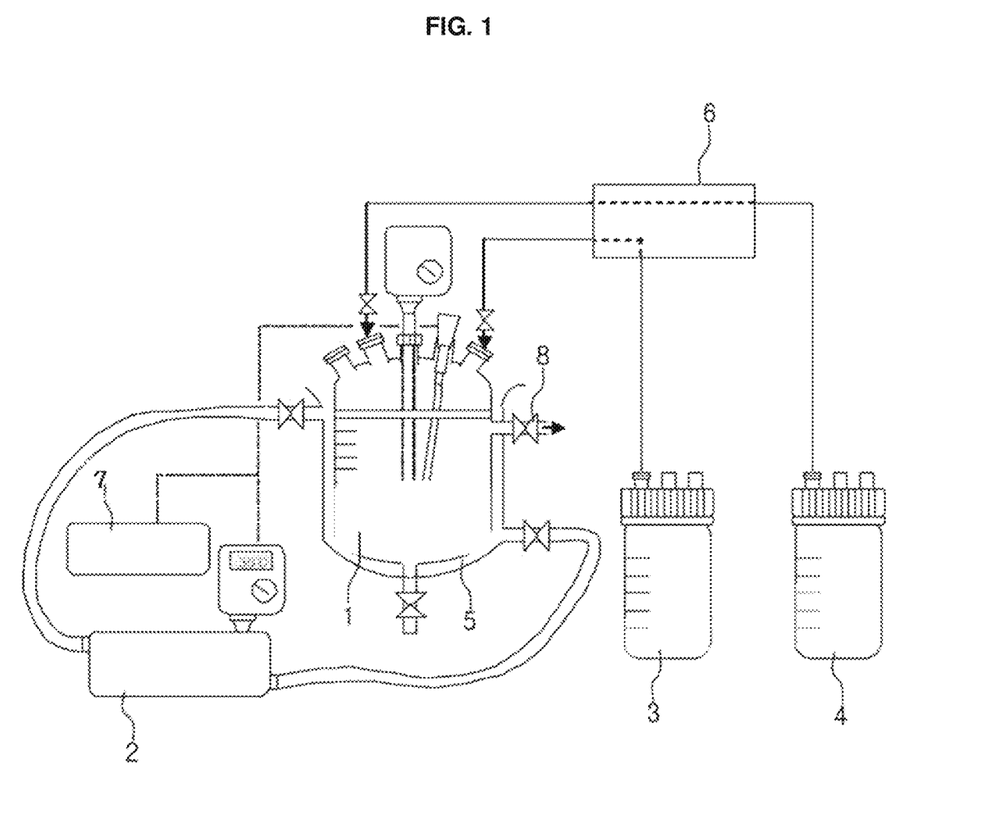
FIG. 1 is a schematic view of a batch reactor according to an existing art.
Figure 2A:
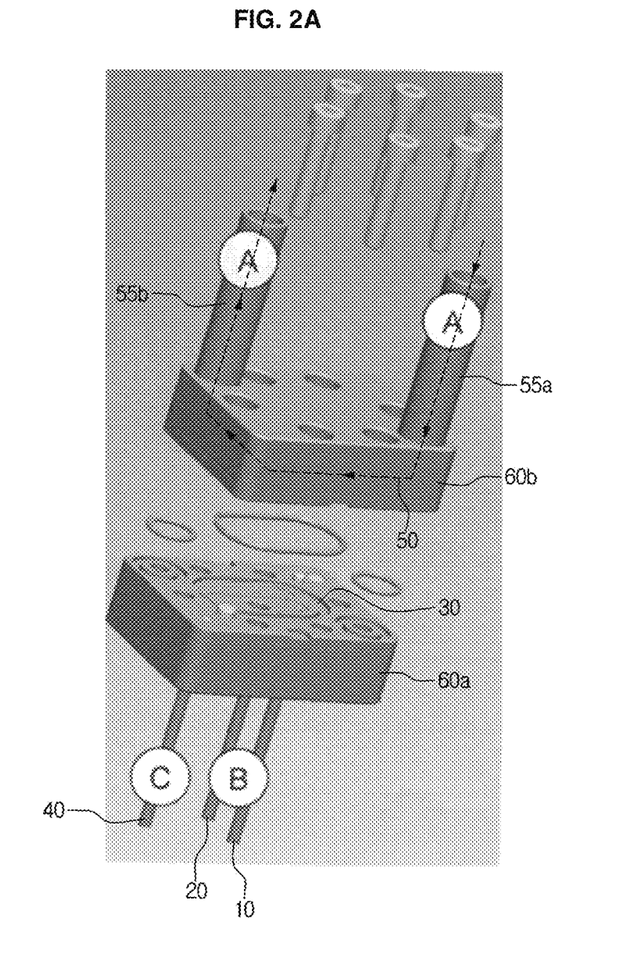
FIG. 2A is an exploded view of an apparatus for preparing germane gas according to an exemplary embodiment of the present disclosure.
Figure 2B:
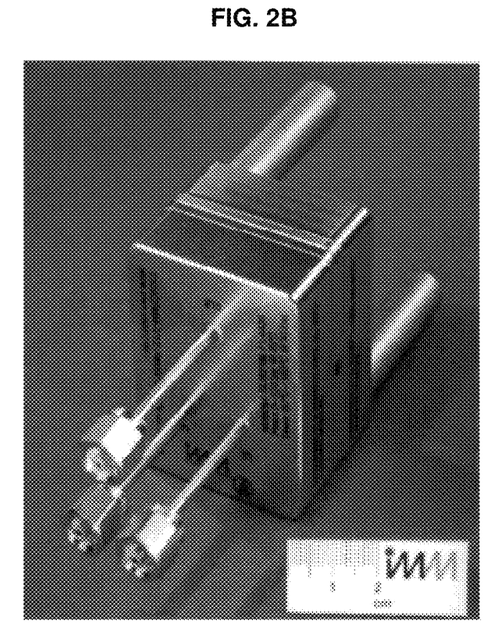
FIG. 2B is an assembled view of an apparatus for preparing germane gas according to an exemplary embodiment of the present disclosure.

An apparatus for preparing germane gas according to the present disclosure includes: a first channel 10 into which an aqueous alkali solution of starting materials is injected; a second channel 20 into which an aqueous acid solution is injected; a third channel 30 which is connected to one end of the first channel 10 and one end of the second channel 20 and in which the aqueous alkali solution and the aqueous acid solution are mixed and reacted to produce monogermane gas and a reaction solution; a discharge outlet 40 through which the monogermane gas and the reaction solution produced in the third channel 30 are discharged; and a coolant circulation unit 50 which is disposed adjacent to the third channel 30 and into and out of which a coolant is injected and discharged, wherein reaction heat generated in the third channel 30 is absorbed by the coolant. The third channel 30 is preferably a microchannel. It is also preferable that the third channel 30 and the coolant circulation unit 50 are disposed spaced apart from each other, the third channel 30 is surrounded by a first metal block 60a, the coolant circulation unit 50 is surrounded by a second metal block 60b, and the first metal block 60a and the second metal block 60b are disposed in contact with each other.

The first channel 10 is not particularly limited as long as the aqueous alkali solution of starting materials is injected thereinto and the injected aqueous alkali solution is transferred to the third channel 30. It is also preferable that the first channel 10 has a shape of a tube, and has corrosion resistance and acid resistance properties. The first channel 10 may be made of one or more materials selected from ceramic, stainless steel, titanium, etc.

The aqueous alkali solution of the starting materials may be prepared by mixing germanium dioxide ($GeO_2$) with an alkali metal hydride and an aqueous alkali solution. The alkali metal hydride may be $NaBH_4$. A method for preparing the aqueous alkali solution of the starting materials is not particularly limited. For example, the aqueous alkali solution may be prepared, as described in U.S. Pat. No. 4,668,502, by adding alkali metal hydride powder to an aqueous metal hydroxide solution of germanium dioxide ($GeO_2$) or by preparing an aqueous alkali solution of a predetermined concentration in advance and then adding germanium dioxide powder and alkali metal hydride powder thereto. In the aqueous alkali solution of the starting materials used in the present disclosure, the concentration of germanium dioxide may be no greater than 0.5 mol/L, more specifically 0.3 mol/L. Specifically, the metal hydroxide may be included in an amount of 2 equivalents or more per 1 mol of germanium dioxide, and the alkali metal hydride may be included in an amount of 4 mol or more per 1 mol of germanium dioxide. Outside these ranges, the conversion ratio of germanium dioxide may decrease and thus the economic efficiency of monogermane production may decrease. The aqueous alkali solution may be an aqueous alkali metal solution or an aqueous alkaline earth metal solution, specifically an aqueous NaOH solution or an aqueous KOH solution. If an aqueous NaOH solution is used as the aqueous alkali solution and if $NaBH_4$ is used as the alkali metal hydride to prepare the aqueous alkali solution of the starting materials, hydrogen is not generated since the $NaBH_4$ is stabilized.

The second channel 20 is not particularly limited as long as the aqueous acid solution is injected thereinto and the injected aqueous acid solution is transferred to the third channel 30. Specifically, the second channel 20 may have a shape of a tube. Specifically, the second channel 20 may have corrosion resistance and acid resistance, so that it may not be corroded by the aqueous acid solution. The second channel 20 may be made of one or more materials selected from ceramic, stainless steel, titanium, etc.

The aqueous acid solution may be prepared by mixing an acid selected from an inorganic acid such as sulfuric acid, phosphoric acid, etc. and an organic acid such as acetic acid, propionic acid, etc. with water. Specifically, use of a volatile acid such as hydrochloric acid may be avoided in consideration of purification of monogermane gas. The concentration of the aqueous acid solution is not particularly limited.

The third channel 30 is not particularly limited as long as it is connected to one end of the first channel 10 and one end of the second channel 20 and the aqueous alkali solution and the aqueous acid solution are mixed and reacted therein. Preferably, the third channel 30 is a microstructured channel. The diameter and length of the microchannel may vary depending on the size of the apparatus and desired production amount of germane gas. Specifically, they may be in the order of tens of micrometers to thousands of micrometers.

Figure 3A:
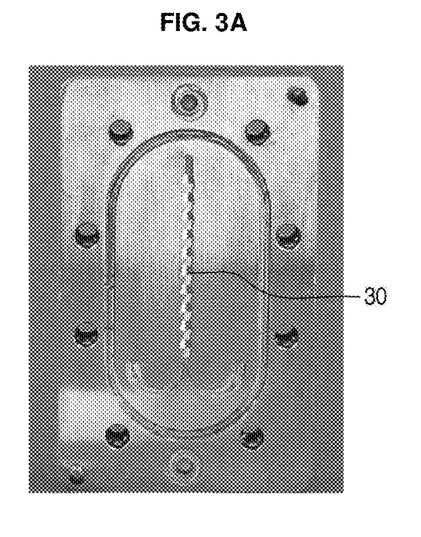
FIG. 3A is a schematic view of a third channel of an apparatus for preparing germane gas according to an exemplary embodiment of the present disclosure.
Figure 3B:
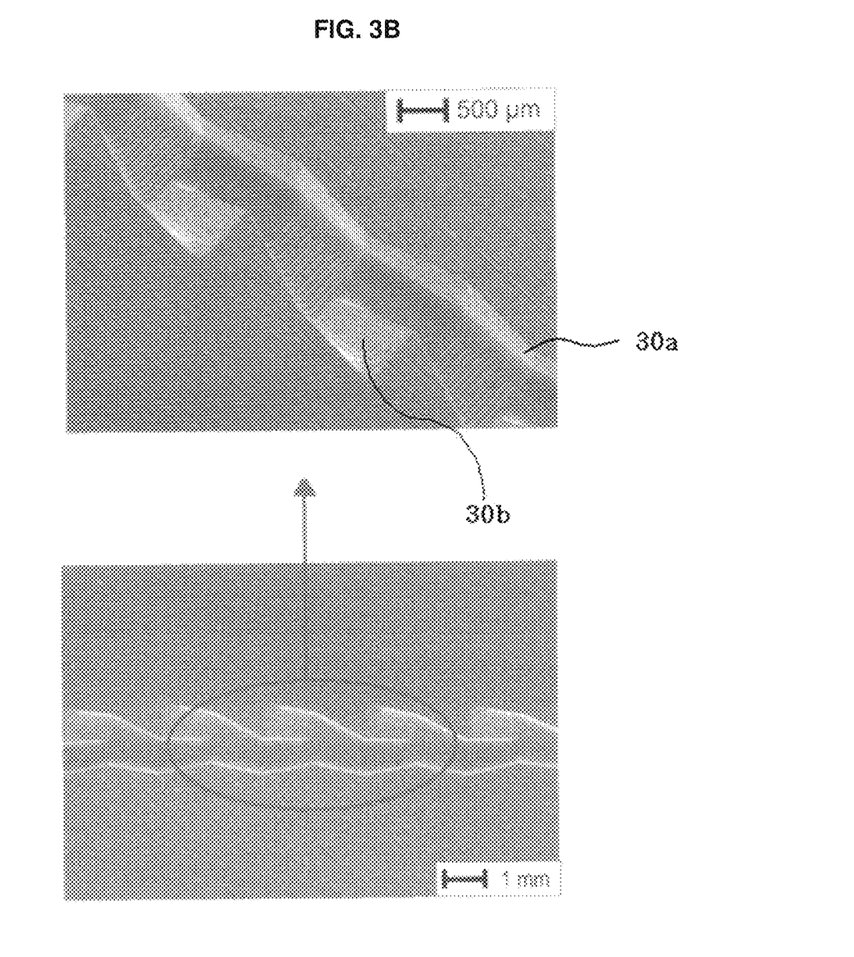
FIG. 3B shows enlarged images of a third channel of an apparatus for preparing germane gas according to an exemplary embodiment of the present disclosure.

The third channel 30 may include a main channel 30a of micro-structure and a plurality of projections 30b protruding in parallel on one side of the main channel. The plurality of projections 30b may have an acute angle with respect to the main channel 30a and may be protruding or elongated in one direction with respect to the main channel. Having the main channel 30a and the projections 30b, a fluid passing through the third channel 30 runs against the projections and continuously moves upward and downward, and thus, allowing the fluid to be split and recombined. Having such a configuration, the third channel 30 not only allows easy mixing of the aqueous starting material solution and the aqueous acid solution injected from the first channel 10 and the second channel 20 but also can facilitate the production of germane gas by increasing the contact area of the aqueous starting material solution and the aqueous acid solution. The third channel 30 may further include a temperature sensor (not shown). The temperature sensor allows real-time measurement of the temperature in the third channel 30, thereby allowing easy control of reaction temperature and flow rate of the coolant passing through the coolant circulation unit 50 and thus increasing production yield of monogermane gas.

The discharge outlet 40 is not particularly limited as long as the germane gas and the reaction solution produced in the third channel 30 can be discharged out of the third channel 30. The discharge outlet 40 is connected to one end of the third channel 30, and may have a shape of a tube. The diameter of the discharge outlet 40 connected to one end of the third channel 30 may vary depending on the size of the apparatus and the desired production amount of germane gas.

The coolant circulation unit 50 may be disposed adjacent to the third channel 30. It includes a coolant inlet through which a coolant is injected and a coolant discharge outlet 55b through which the coolant is discharged. It is not particularly limited as long as the coolant which absorbs the reaction heat generated in the third channel 30 can pass therethrough. The coolant circulation unit 50 may be a linear or zigzag-shaped tube through which the coolant can pass. The diameter of the coolant circulation unit 50 may vary depending on the size of the apparatus and the desired production amount of germane gas.

The coolant circulating in the coolant circulation unit 50 is not particularly limited as long as it is a fluid that can be injected into the coolant circulation unit 50 through a coolant inlet 55a located at one end of the coolant circulation unit 50 and discharged through a coolant discharge outlet 55b located at another end of the coolant circulation unit 50 and does not freeze at 0° C. or below. Specifically, it may be ethylene glycol.

In an exemplary embodiment, the third channel 30 and the coolant circulation unit 50 may be disposed spaced apart from each other, the third channel 30 may be surrounded by a first metal block 60a, the coolant circulation unit 50 may be surrounded by a second metal block 60b, and the first metal block 60a and the second metal block 60b may be disposed in contact with each other. In this exemplary embodiment, the reaction heat generated in the third channel 30 is transferred to the first metal block 60a surrounding the third channel 30, the reaction heat transferred to the first metal block 60a is transferred to the second metal block 60b contacting with the first metal block 60a, and the reaction heat transferred to the second metal block 60b is transferred to the coolant circulation unit 50 surrounded by the second metal block 60b. The reaction heat transferred to the coolant circulation unit 50 is absorbed by the coolant circulating in the coolant circulation unit 50.

The first metal block 60a is not particularly limited as long as it surrounds the third channel 30. Specifically, it may be made of a metallic material having high thermal conductivity. The second metal block 60b is not particularly limited as long as it surrounds the coolant circulation unit 50. Specifically, it may be made of a metallic material having high thermal conductivity.

In an exemplary embodiment, the first and second metal blocks 60a, 60b may have a rectangular shape. As the contact area of the first and second metal blocks 60a, 60b is substantially large, the reaction heat may be better transferred from the third channel 30 to the coolant circulation unit 50.

Method for Preparing Monogermane Gas

Step 1: Injection of the Aqueous Alkali Solution of Starting Materials and Aqueous Acid Solution First, an aqueous alkali solution of starting materials including germanium dioxide ($GeO_2$) and an alkali metal hydride and an aqueous acid solution, are injected into a first channel 10 and a second channel 20, respectively.

The aqueous alkali solution injected into the first channel 10 may be prepared by mixing germanium dioxide ($GeO_2$) with an alkali metal hydride and an aqueous alkali solution. The alkali metal hydride may be $NaBH_4$. The aqueous alkali solution may be prepared, as described in U.S. Pat. No. 4,668,502, by adding alkali metal hydride powder to an aqueous metal hydroxide solution of germanium dioxide ($GeO_2$) or by preparing an aqueous alkali solution of a predetermined concentration in advance and then adding germanium dioxide powder and alkali metal hydride powder thereto, although not being limited thereto. In the aqueous alkali solution of starting materials used in the present disclosure, the concentration of germanium dioxide may be no greater than 0.5 mol/L, more specifically 0.3 mol/L. The metal hydroxide may be included in an amount of 2 equivalents or more per 1 mol of germanium dioxide, and the alkali metal hydride may be included in an amount of 4 mol or more per 1 mol of germanium dioxide. Outside these ranges, the conversion ratio of germanium dioxide may decrease and thus the economic efficiency of monogermane production may decrease. The aqueous alkali solution may be an aqueous alkali metal solution or an aqueous alkaline earth metal solution, specifically an aqueous NaOH solution or an aqueous KOH solution. If an aqueous NaOH solution is used as the aqueous alkali solution and if $NaBH_4$ is used as the alkali metal hydride to prepare the aqueous alkali solution, hydrogen is not generated since the $NaBH_4$ is stabilized.

The aqueous acid solution injected into the second channel 20 may be prepared by mixing an acid selected from an inorganic acid such as sulfuric acid, phosphoric acid, etc. and an organic acid such as acetic acid, propionic acid, etc. with water. Specifically, use of a volatile acid such as hydrochloric acid may be avoided in consideration of purification of monogermane gas. The concentration of the aqueous acid solution is not particularly limited.

The injection rate of the aqueous alkali solution of starting materials and the aqueous acid solution may be tens of milliliters per minute. The injection rate may vary depending on the size of the apparatus and the desired production amount of germane gas.

The aqueous alkali solution of starting materials and the aqueous acid solution may be injected into the first channel 10 and the second channel 20 using any device capable of continuously injecting the aqueous alkali solution and the aqueous acid solution into the first channel 10 and the second channel 20, without particular limitation thereto. Specifically, a metering pump, etc. may be used.

Step 2

The aqueous alkali solution of starting materials and the aqueous acid solution injected respectively to the first channel 10 and the second channel 20 are transferred to a third channel 30 connected to one end of the first channel 10 and one end of the second channel 20 through the channels. In the third channel 30, the transferred aqueous alkali solution of starting materials and aqueous acid solution are mixed and production of germane gas occurs at the interface where they contact with each other.

Specifically, the third channel 30 wherein the reaction occurs may be a microchannel. Being a microstructured channel, the third channel 30 can facilitate the production of germane gas and maximize the effect of controlling increase in temperature owing to the associated reaction heat. It is because the production of germane gas occurs only at the interface where the aqueous alkali solution of starting materials and the aqueous acid solution contact with each other. That is to say, the interfacial area where the two solutions contact with each other increases as they are smaller in droplet size and larger in number since the mixing in micrometer scale becomes easier.

The third channel 30 may include a main channel 30a of micro-structure and a plurality of auxiliary projections 30b protruding in parallel on one side of the main channel. The plurality of projections 30b may have an acute angle with respect to the main channel 30a and may protrude in one direction. Accordingly, the aqueous alkali solution of starting materials and the aqueous acid solution respectively injected into the third channel 30 may run against the projections and continuously move upward and downward between the main channel 30a and the plurality of projections 30b and may be split or recombined. As a result, the aqueous alkali solution of starting materials and the aqueous acid solution are readily mixed in micrometer scale and react with each other at the interface to produce germane gas.

Reaction heat is generated as the germane gas is produced. Because of the reaction heat, the temperature inside the third channel 30 may increase rapidly. To prevent this problem, a coolant circulation unit 50 disposed adjacent to the third channel 30 absorbs the reaction heat as the reaction occurs.

In an exemplary embodiment, germane gas is produced in the third channel 30 and the reaction heat generated during the production of germane gas is transferred to a first metal block 60a surrounding the third channel 30. The first metal block 60a transfers the reaction heat to a second metal block 60b contacting with the first metal block 60a. The reaction heat transferred to the second metal block 60b is transferred to the coolant circulation unit 50 surrounded by the second metal block 60b. The reaction heat transferred to the coolant circulation unit 50 is absorbed by the coolant circulating in the coolant circulation unit 50. The absorption of the reaction heat may be controlled by controlling the temperature and flow rate of the coolant supplied to the coolant circulation unit 50. If the injection amount of the aqueous alkali solution of starting materials and the aqueous acid solution into the third channel 30 is increased to increase the production amount of germane gas, the reaction temperature inside the third channel 30 may be maintained constant by lowering the temperature of the coolant or by increasing the flow rate of the coolant.

The temperature of the third channel 30 may be controlled by controlling at least one factor selected from a flow rate of the coolant, a temperature of the coolant, and a flow rate of the aqueous alkali solution of starting materials or the aqueous acid solution. The temperature of the third channel 30 is preferably maintained at 50° C. or below, more specifically at 0-50° C. If the temperature is higher than this range, formation of higher-germane, not monogermane, may be accelerated as a result of reaction between the aqueous alkali solution of starting materials and the aqueous acid solution, thereby negatively affecting the yield of monogermane gas.

In an exemplary embodiment, the third channel 30 is at least one in number, and the third channels 30 are connected in parallel, and the aqueous alkali solution and the aqueous acid solution are injected into the third channels 30 so as to produce monogermane gas in the third channels 30. If the third channels 30 are connected in parallel, a large amount of monogermane gas can be produced in commercial scale.

Step 3

The monogermane gas and the reaction solution produced from the reaction are discharged out of the third channel 30 through a discharge outlet 40 connected to one end of the third channel 30. The discharged monogermane gas is collected separately from the reaction solution. Through the above-described procedure, the monogermane gas is produced with high yield of 90% or higher.

When germane gas is produced using the conventional batch reactor or continuous reactor, it is difficult to control the temperature increase inside the reactor caused by the reaction heat from the production of the germane gas even when a coolant is circulated in a jacket surrounding the conventional reactor.

However, the reactor including a microstructured channel according to the present disclosure is advantageous not only in that the mixing and reaction of the aqueous alkali solution of starting materials and the aqueous acid solution is easier but also in that the temperature of the reactor can be easily maintained at 0-50° C. owing to the maximized cooling effect as disclosed. As a result, a large amount of monogermane gas can be produced with high yield.

EXAMPLES

Hereinafter, the present disclosure is described in detail through examples. However, the following examples are for illustrative purposes only and it will be apparent to those of ordinary skill in the art that the scope of the present disclosure is not limited by the examples.

Example 1

75 g of strong (96%) sulfuric acid ($H_2SO_4$) was dissolved in 500 mL of distilled water to prepare an aqueous acid solution at 20° C.

2.82 mL of a 50% aqueous NaOH solution was dissolved in 250 mL of distilled water, and 3.4 g of germanium dioxide ($GeO_2$) and 7.4 g of $NaBH_4$ were sequentially dissolved in the resulting solution to prepare an aqueous alkali solution of the starting materials at 20° C.

The aqueous alkali solution of the starting materials was injected into a first channel 10 of an apparatus for preparing germane gas according to an exemplary embodiment of the present disclosure (see FIG. 2A) at a rate of 8 mL/min. At the same time, the aqueous acid solution was injected into a second channel 20 at a rate of 16 mL/min. The injection was carried out using a metering pump. Increase in temperature was measured as germane gas was produced using the apparatus. The temperature of the reaction solution discharged through a discharge outlet 40 connected to a third channel 30 was measured.

Circulation of ethylene glycol as a coolant into a coolant circulation unit 50 of the apparatus for preparing germane gas was started when the temperature of the third channel 30 was maintained constant. The temperature of the third channel 30 was maintained at about 38° C. and the circulation of ethylene glycol was started from then. The ethylene glycol was supplied at 15° C. at a rate of 120 mL/min. As the circulation of the coolant began, the temperature of the third channel 30 decreased rapidly and was maintained at about 23° C.

Examples 2-4

The flow rate of the aqueous alkali solution of the starting materials and the aqueous sulfuric acid solution was increased to 2, 3, and 4 times with other conditions maintained the same as in Example 1.

Figure 4:
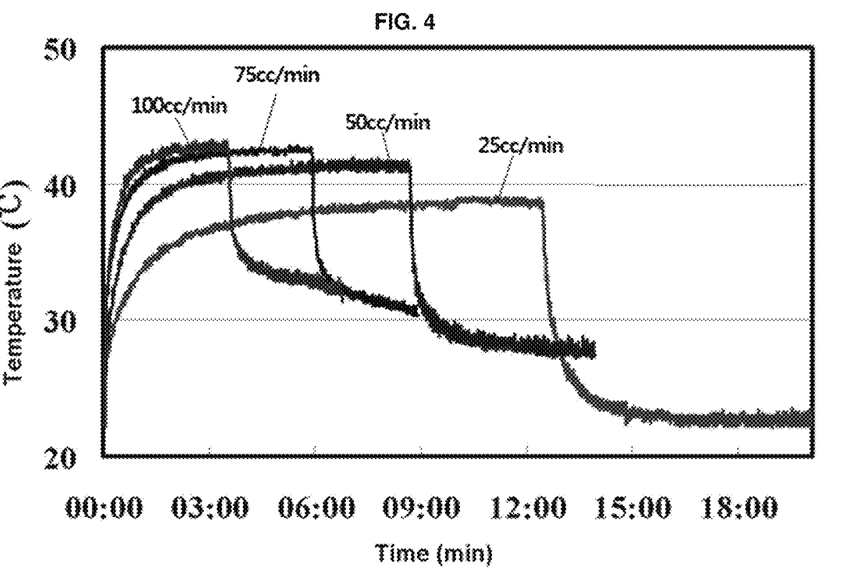
FIG. 4 shows change in the temperature of a third channel in Examples 1-4.

In Example 2, the temperature of the third channel 30 was maintained at 42° C. When ethylene glycol at 5° C. was supplied, the temperature of the third channel 30 decreased rapidly and was maintained at about 28° C. (see FIG. 4).

In Example 3, the temperature of the third channel 30 was maintained at 43° C. When ethylene glycol at −5° C. was supplied, the temperature of the third channel 30 decreased rapidly and was maintained at about 30° C. (see FIG. 4).

In Example 4, the temperature of the third channel 30 was maintained at 43° C. When ethylene glycol at −10° C. was supplied, the temperature of the third channel 30 decreased rapidly and was maintained at about 32° C. (see FIG. 4).

Comparative Example 1

An aqueous alkali solution of the starting materials and an aqueous acid solution were prepared as in Example 1.

The aqueous alkali solution of the starting materials and the aqueous sulfuric acid solution were injected into a 1-L glass reactor using a metering pump, with the same flow rate as in Example 4.

Figure 5:
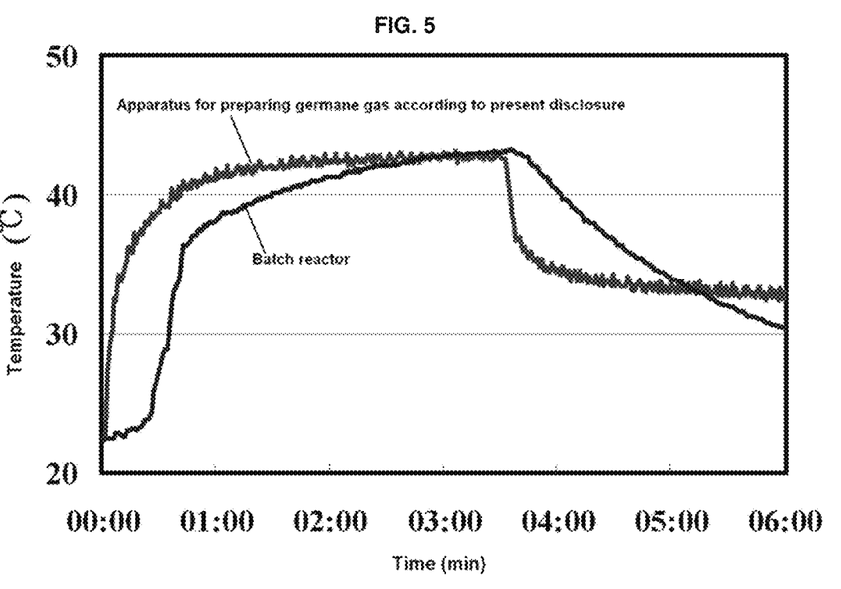
FIG. 5 shows change in the temperature of a third channel in Example 4 and Comparative Example 1.

When the temperature of the 1-L glass reactor reached 43° C., ethylene glycol (coolant) at −10° C. was circulated at a rate of 250 mL/min (see FIG. 5).

To compare the results of Example 4 and Comparative Example 1, the cooling effect by the coolant ethylene glycol was remarkably improved when the apparatus for preparing germane gas according to the present disclosure was used (Example 4) as compared to when the existing reactor was used (Comparative Example 1). Thanks to the superior cooling effect, it was easier to maintain the temperature favorable for preparation of monogermane gas (i.e., 0-50° C.) by controlling the reaction heat generated during the production of germane gas in large quantity (see FIG. 5).

Accordingly, it can be seen that the apparatus for preparing germane gas and the method for preparing monogermane gas according to the present disclosure are advantageous not only in the mixing and reaction of the reactants but also in the control of the increase of reaction temperature due to the reaction heat. As a result, a large amount of monogermane gas can be produced with high yield.

While the exemplary embodiments have been shown and described, it will be understood by those skilled in the art that various changes in form and details may be made thereto without departing from the spirit and scope of this disclosure as defined by the appended claims.

---

Description of Main Elements

1: batch reactor
2: circulator
3: reservoir of an aqueous alkali solution of starting materials
4: aqueous acid solution reservoir
5: coolant circulation unit
6: metering pump
7: recorder
8: discharge outlet
10: first channel
20: second channel
30: third channel (30a: main channel, 30b: projection)
40: discharge outlet
50: coolant circulation unit (55a: coolant inlet, 55b: coolant discharge outlet)
60: metal block (60a: first metal block, 60b: second metal block).

---

What is claimed is:

1. A method for preparing monogermane gas, comprising:
   injecting an aqueous alkali solution of starting materials and an aqueous acid solution into a first channel and a second channel, respectively, the aqueous alkali solution containing germanium dioxide ($GeO_2$) and an alkali metal hydride;
   mixing the injected aqueous alkali solution of the starting materials and the aqueous acid solution in a third channel connected to the first channel and the second channel, and reacting the mixed solutions to produce monogermane gas and a reaction solution; and
   discharging the produced monogermane gas and the reaction solution out of the third channel,
   wherein reaction heat generated in the third channel is absorbed by a coolant circulating in a coolant circulation unit disposed adjacent to the third channel,
   wherein the third channel is a microchannel.

2. The method for preparing monogermane gas according to claim 1, wherein the third channel comprises a main channel and a plurality of projections formed on the main channel.

3. The method for preparing monogermane gas according to claim 2, wherein the plurality of projections have an acute angle with respect to the main channel and protrude in one direction.

4. The method for preparing monogermane gas according to claim 1, wherein the third channel is maintained at a temperature of 0-50° C.

5. The method for preparing monogermane gas according to claim 4, wherein the temperature of the third channel is controlled by controlling at least one factor selected from a flow rate of the coolant, a temperature of the coolant, and a flow rate of the aqueous alkali solution of the starting materials or the aqueous acid solution.

6. The method for preparing monogermane gas according to claim 1, wherein the reaction heat generated in the third channel is transferred to a first metal block surrounding the third channel, to a second metal block contacting with the first metal block, and to the coolant circulation unit surrounded by the second metal block as the coolant circulates in the coolant circulation unit.

7. The method for preparing monogermane gas according to claim 1, the third channel is more than one in number, the third channels are connected in parallel, and the aqueous alkali solution and the aqueous acid solution are injected into the third channels so as to produce monogermane gas in the third channels.

8. The method for preparing monogermane gas according to claim 1, wherein the alkali metal hydride is $NaBH_4$.

9. The method for preparing monogermane gas according to claim 1, wherein the aqueous acid solution comprises an inorganic acid or an organic acid, wherein the inorganic acid is one or more selected from a group consisting of sulfuric acid and phosphoric acid, and the organic acid is one or more selected from a group consisting of acetic acid and propionic acid.

10. An apparatus for preparing germane gas, comprising:
a first channel into which an aqueous alkali solution of starting materials is injected;
a second channel into which an aqueous acid solution is injected;
a third channel which is connected to the first channel and the second channel and in which the aqueous alkali solution and the aqueous acid solution are mixed and reacted to produce monogermane gas and a reaction solution;
a discharge outlet through which the monogermane gas and the reaction solution produced in the third channel are discharged; and
a coolant circulation unit which is disposed adjacent to the third channel and into and out of which a coolant is injected and discharged, wherein reaction heat generated in the third channel is absorbed by the coolant,
wherein the third channel is a microchannel.

11. The apparatus for preparing germane gas according to claim 10, wherein the third channel and the coolant circulation unit are disposed spaced apart from each other, the third channel is surrounded by a first metal block, the coolant circulation unit is surrounded by a second metal block, and the first metal block and the second metal block are disposed in contact with each other.

* * * * *